United States Patent
Thorn

(10) Patent No.: US 12,491,450 B1
(45) Date of Patent: Dec. 9, 2025

(54) MODULAR WATER PURIFICATION SYSTEM

(71) Applicant: David Thorn, Gaithersburg, MD (US)

(72) Inventor: David Thorn, Gaithersburg, MD (US)

( * ) Notice: Subject to any disclaimer, the term of this patent is extended or adjusted under 35 U.S.C. 154(b) by 0 days.

(21) Appl. No.: 18/897,713

(22) Filed: Sep. 26, 2024

(51) Int. Cl.
*C02F 1/14* (2023.01)
*B01D 1/00* (2006.01)
*B01D 5/00* (2006.01)
*C02F 1/04* (2023.01)

(52) U.S. Cl.
CPC ......... *B01D 1/0088* (2013.01); *B01D 1/0035* (2013.01); *B01D 5/006* (2013.01); *C02F 1/048* (2013.01); *C02F 1/14* (2013.01); *C02F 2201/007* (2013.01); *C02F 2201/009* (2013.01)

(58) Field of Classification Search
CPC .... B01D 1/0035; B01D 1/0088; B01D 5/006; C02F 1/048; C02F 1/14; C02F 2201/007; C02F 2201/009
See application file for complete search history.

(56) References Cited

U.S. PATENT DOCUMENTS

| | | | | |
|---|---|---|---|---|
| 3,104,210 A * | 9/1963 | Mount | ...... | C02F 1/14 202/234 |
| 3,655,517 A * | 4/1972 | Hensley, Jr. | ...... | C02F 1/14 203/DIG. 1 |
| 4,134,393 A * | 1/1979 | Stark | ...... | C02F 1/14 126/714 |
| 4,194,949 A * | 3/1980 | Stark | ...... | F24S 23/30 202/180 |
| 4,270,981 A * | 6/1981 | Stark | ...... | C02F 1/14 202/180 |
| 4,292,136 A * | 9/1981 | Clavier | ...... | B01D 5/0066 203/DIG. 1 |
| 4,383,891 A * | 5/1983 | Clavier | ...... | F24S 23/00 203/DIG. 1 |
| 5,316,626 A * | 5/1994 | Guy | ...... | C02F 1/14 202/180 |
| 6,821,395 B1 * | 11/2004 | Ward | ...... | C02F 1/14 203/DIG. 1 |
| 7,507,316 B2 * | 3/2009 | Ward | ...... | C02F 1/14 202/184 |
| 7,527,711 B2 * | 5/2009 | Ciudaj | ...... | B01D 5/0036 203/DIG. 1 |
| 7,955,477 B2 * | 6/2011 | Foster | ...... | C02F 1/14 159/32 |

(Continued)

*Primary Examiner* — Jonathan Miller
(74) *Attorney, Agent, or Firm* — Sanchelima & Associates, P.A.; Jesus Sanchelima; Christian Sanchelima

(57) ABSTRACT

A modular water purification system comprising an evaporation assembly, a condensation assembly, and a waterproof enclosure The evaporation assembly is heated primarily by sun heat, with optional supplementary heating. The condensation assembly converts water vapor to liquid, optionally aided by external power. The waterproof enclosure covers and seals the condensation assembly and the evaporation assembly to prevent external contamination defining a water purification device. The water purification device includes an inlet for the water source and an outlet from the condenser reservoir. The modular water purification system allows for vertical stacking, enabling simultaneous increase in water elevation and purity as it progresses through the stack.

14 Claims, 3 Drawing Sheets

(56) References Cited

U.S. PATENT DOCUMENTS

| | | | | |
|---|---|---|---|---|
| 8,083,902 | B2 * | 12/2011 | Al-Garni | B01D 5/006 165/146 |
| 10,456,780 | B1 * | 10/2019 | Al-Sulaiman | C02F 1/043 |
| 11,465,067 | B2 * | 10/2022 | Simpson | B01D 5/006 |
| 2002/0162733 | A1 * | 11/2002 | Foster | C02F 1/14 203/1 |
| 2004/0195083 | A1 * | 10/2004 | Ward | C02F 1/14 203/DIG. 1 |
| 2005/0067271 | A1 * | 3/2005 | Ciudaj | C02F 1/14 203/DIG. 1 |
| 2007/0193870 | A1 * | 8/2007 | Prueitt | B01D 1/26 159/32 |
| 2008/0067054 | A1 * | 3/2008 | Foster | C02F 1/14 202/176 |
| 2008/0078670 | A1 * | 4/2008 | Al-Garni | B01D 1/0035 202/234 |
| 2011/0139601 | A1 * | 6/2011 | Johnstone | B01D 5/006 202/180 |
| 2014/0231327 | A1 * | 8/2014 | D'Alba | B01D 5/0066 210/175 |

* cited by examiner

MODULAR WATER PURIFICATION SYSTEM

BACKGROUND OF THE INVENTION

1. Field of the Invention

The present invention relates to water purification systems and, more particularly, to water a purification system that is modular and stackable to purify water.

2. Description of the Related Art

Several designs for water purification systems have been designed in the past. None of them, however, include a modular water purification system that has at least one water purification device with an evaporation member and with a condensation member to evaporate and condensate water for purifying the water. The water purification device is stackable to multiple water purification devices defining a modular water purification system in a stairs-like configuration for a higher water purification and to pump water.

Applicant believes that a related reference corresponds to patent application No. WO2018162225A2 issued for a device for the evaporation and condensation of water to obtain potable water. The device includes a closed chamber with an evaporation surface onto which water containing liquid flows over the at least partially descending evaporation surface and can then be discharged from the chamber via an outlet. Above the evaporation surface, an inclined film is arranged on which water can condensate on the side facing the evaporation surface and can be conveyed from the inclined film through an outlet to a collector enabling condensed water to be obtained from salt water or blackish water over a large area using simple means. The reference WO2018162225A2 fails to teach of a water purification system that has an evaporation platform that can be assisted by other means such as electricity. Furthermore, the purification system disclosed by the reference is not modular.

Applicant believes that another related reference corresponds to application patent No. CN109626465A issued for a kind of apparatus for evaporation condensation that has a first circulation portion configured to heat fluid to generate vapor, and a second circulation portion configured to condense vapor. The apparatus can float on the water surface so that the circulation portion and the second circulation portion are located on the water surface and under the water surface. The reference CN109626465A does not teach of a modular water purification system that is stackable and can be arranged in a vertical configuration to purify and pump water. The stackability and modularity of the present invention is a core aspect of the invention and has the advantage of allowing for greater scalability and adaptability to different environments and water purification needs. It can be easily expanded or reduced in size, and transported more easily in its modular form. The modular water purification system uses the power of solar energy to create a continuous cycle of evaporation and condensation, effectively purifying the water and elevating it to desired heights without the use of traditional pumps or moving parts.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a modular water purification system that is designed to address the growing need for sustainable water treatment and transport solutions. The present invention uses the power of solar energy to create a continuous cycle of evaporation and condensation to purify the water and pump the water to desired heights without the use of traditional pumps or moving parts.

It is one of the objects of the present invention to provide a modular water purification system that is stackable and can be configured to pump water.

It is another object of this invention to provide a modular water purification system that has an evaporation platform configured to evaporate water with solar radiation. The evaporation platform has auxiliary heating elements to assist the water evaporation process when needed.

It is still another object of the present invention to provide a modular water purification system that can be arranged in a stairs-like configuration with multiple purification devices stacked to increase the pureness of water, where the last step of the stairs-like configuration has a filter to filter the water.

It is still another object of the present invention to provide a modular water purification system that offers a scalable solution for water purification, combining natural and optional powered processes in a contained, efficient system adaptable to various purification needs.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
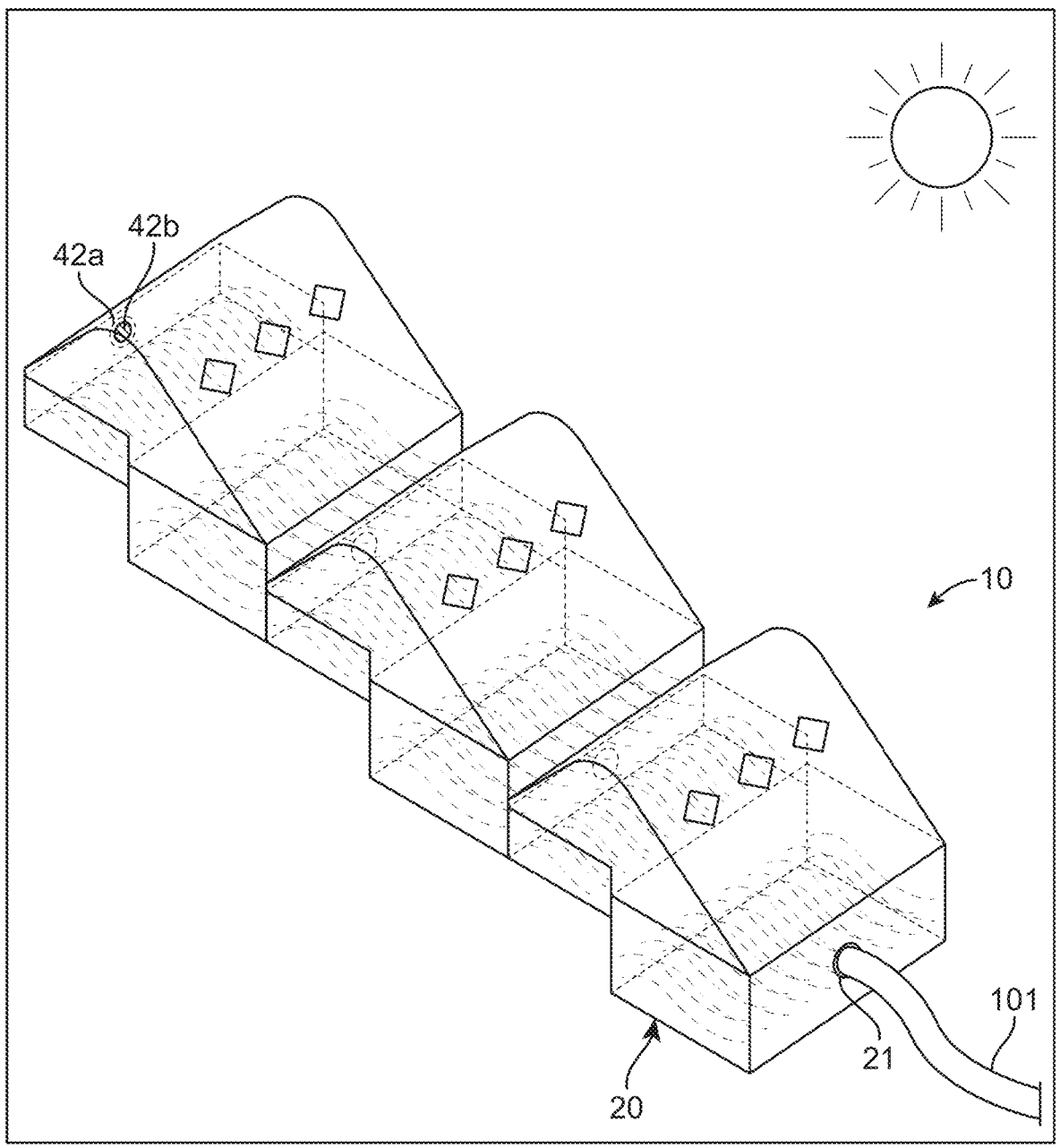
FIG. 1 represents an isometric operational view of the present invention 10 showing multiple purification devices modularly stacked defining a stepped purification system configuration.

Referring now to the drawings, where the present invention is generally referred to with numeral 10, it can be observed that it basically includes an evaporation assembly 20, a condensation assembly 40 and an enclosure 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
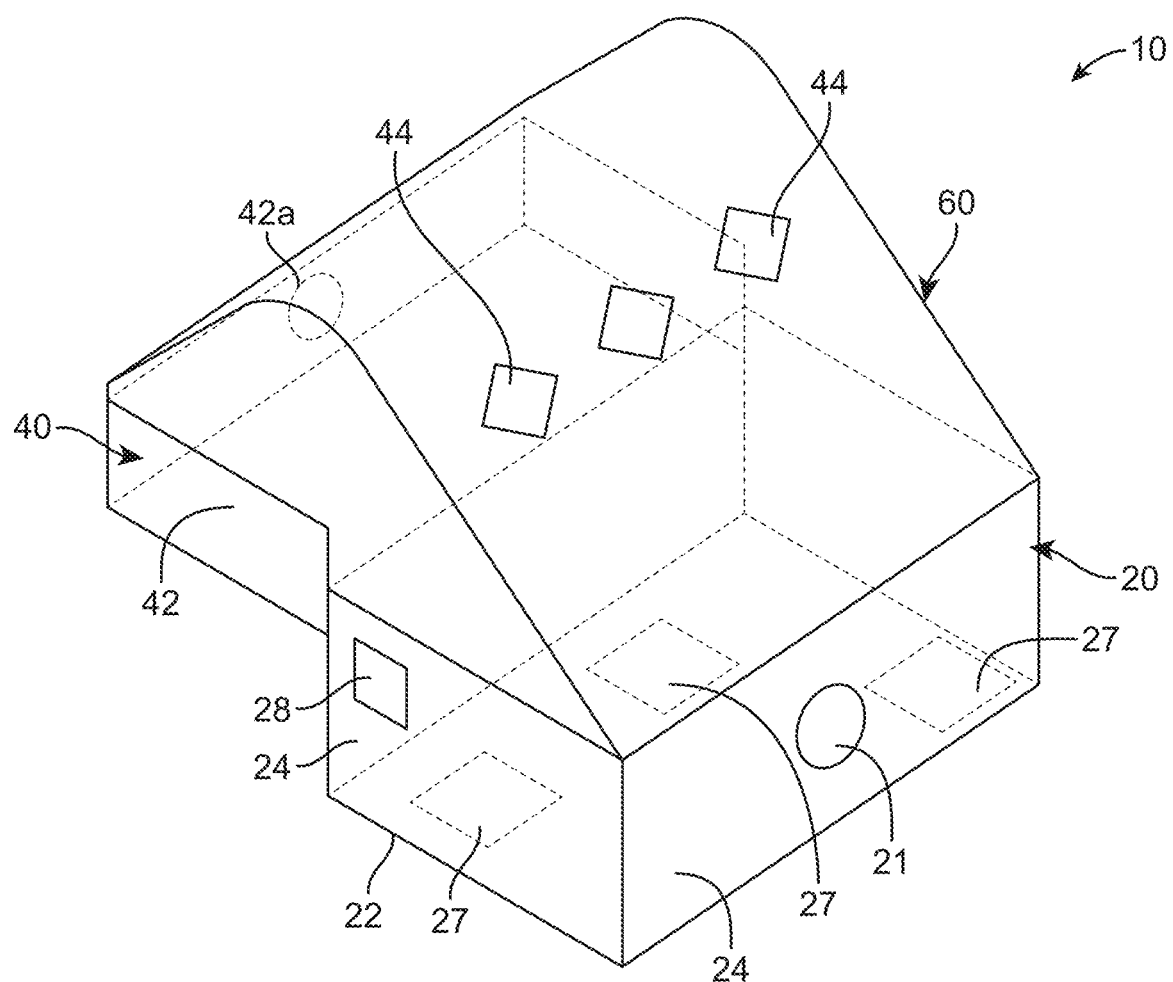
FIG. 2 shows an isometric view of one of the preferred embodiments of the present invention 10.
Figure 3:
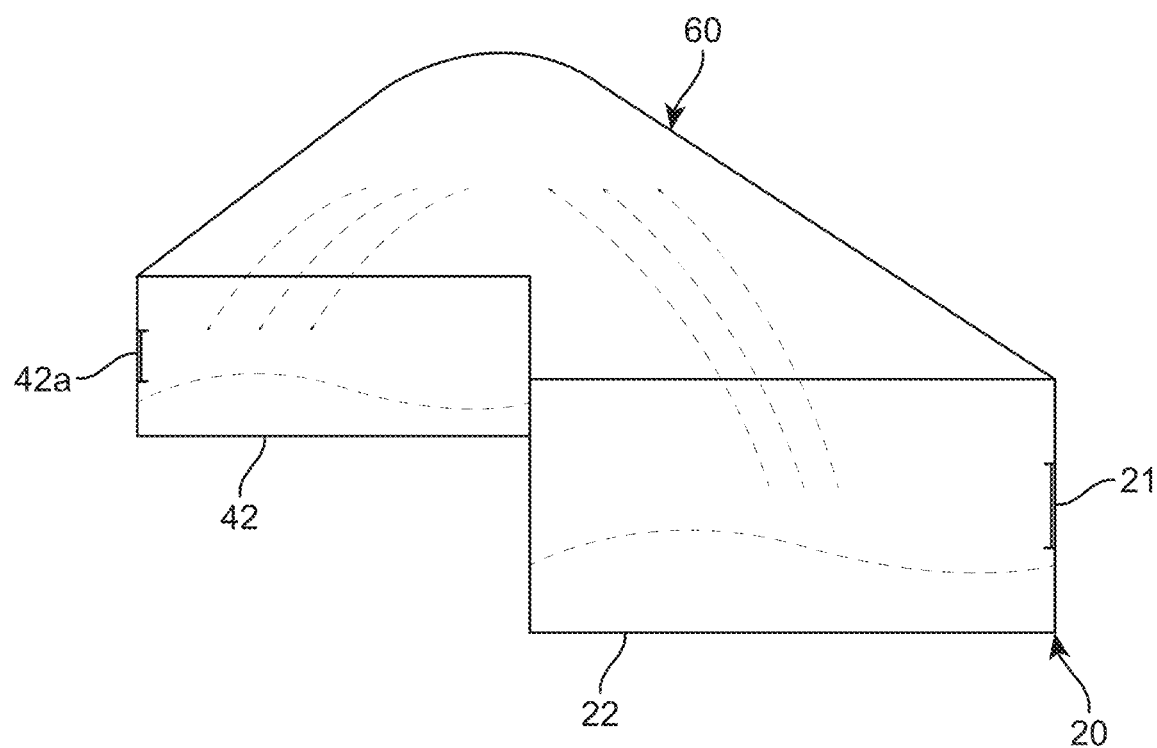
FIG. 3 illustrates a side view of one of the preferred embodiments of the present invention 10.

Best observed in FIG. 2, the evaporation assembly 20 may include a platform 22. The platform 22 is an evaporation platform with a surface configured to receive water. In one embodiment, the platform 22 may have a substantially rectangular shape. In other embodiments, the platform 22 may have other suitable shapes such as circular, oval, square, or any other shape. The platform 22 may have walls 24 perpendicularly attached to each edge of the platform 22. In one particular embodiment, the evaporation assembly 20 has a rectangular platform 22 with four walls 24 with a rectangular shape located on an entire perimeter of the platform 22 defining an evaporation container with a substantially cuboid shape. The walls 24 may be slightly short compared to the area of the platform 22 defining a thin evaporation container to allow water to be heated efficiently. It should be understood that the evaporation assembly 20 may have any other suitable shape to receive water inside and to evaporate the water. The walls 24 may be entirely sealed with the platform 22 to avoid water or vapor water to escape therefrom. The evaporation assembly 20 may further have an inlet 21. In one of the embodiments, the inlet 21 may be located on a front side of the evaporation container. The inlet 21 may be located in any other suitable location of the evaporation assembly 20. The inlet 21 may have a circular shape or any other suitable shape. The inlet 21 may be connected to a water source, for example the inlet 21 may be connected to a hose 101.

In one embodiment, the evaporation assembly 20 may include heating elements 27 as supplementary heating source to assist the evaporation of water when there is low sun heat. The heating elements 27 may be located in the platform 22. It also may be suitable to place the heating elements 27 on the entire evaporation assembly 20 to assist the evaporation of water. The heating elements 27 may be for example electrical heating elements such as but not limited to resistors configured to convert electrical power into heat to increase the temperature of water inside the evaporation assembly 20 and thus evaporate the water. The heating elements 27 may be electrically connected to a battery 28. The battery 28 may provide electrical power to the heating elements 27. In other embodiments, the heating elements 27 may be connected to other power sources such as electric grid.

The condensation assembly 40 may include condensation reservoir 42 located on a rear elevated portion of the evaporation assembly 20. In one embodiment, the condensation reservoir 42 may have a substantially cuboid shape with a rectangular base. In other embodiments the condensation reservoir 42 may have any other suitable shape. The condensation reservoir 42 may have condensers 44 integrated in different portions of the condensation assembly 40. For example, the condensers 44 may be integrated on the walls of the condensation reservoir 42. The condensers 44 may also be integrated on the roof of the water purification device. The condensers 44 may be integrated on the enclosure 60. The condensers 44 may be configured to maintain a lower temperature than the evaporation area. The condensers 44 may be optionally assisted by external power sources. For example, the condensers 44 may be assisted by the battery 28. The condensers 44 may be cold to efficiently cool and condensate the water vapor.

The condensation reservoir 42 may have an outlet 42a. In one embodiment, the outlet 42a may be located on a rear side of the condensation reservoir 42. The outlet 42a may have a circular shape. It should be understood that the outlet 42a may be located in other portion of the condensation reservoir 42 and have other shapes. The outlet 42a may be provided with a particle filter to filter debris off the water and thus increase the water purity. The outlet 42a may cooperate with the inlet 21 of a second modular water purification device. The outlet 42a may allow the purified water to be expelled from the condensation assembly 40.

The enclosure 60 may be a waterproof enclosure that seals the evaporation assembly 20 and the condensation assembly 40 to contain the water vapor inside the water purification system. The enclosure 60 may prevent external air contamination of the water purification system. Preferably the enclosure 60 and portions of the evaporation assembly 20 may be transparent to allow solar energy to reach the platform 22 directly to evaporate the water.

The evaporation assembly 20, condensation assembly 40 and enclosure 60 may define the water purification system. The evaporation assembly 20 and the enclosure 60 may be thin to allow temperature to heat the water up. The water purification system may be used to purify water. Water may be provided to the evaporation assembly 20 through the inlet 21. The water may be received by the platform 22. The water may be evaporated in the platform 22 by sun heat. Alternatively, the heating elements 27 may assist the water evaporation to produce water vapor. The water vapor may be condensed by the condensers 44 of the condensation assembly 40. Condensed water droplets may flow down the condensation reservoir 42. The collected condensed water is purified through the process of evaporation and condensation.

The water purification system may be stackable as observed in FIG. 1. A first water purification device may be connected to a water source. The outlet of the first water purification device may be connected to the inlet of a second water purification device in a vertical stackable way. The second water purification device may be connected to a third water purification device. It should be understood that multiple water purification devices may be modularly connected in a stackable way defining a modular water purification system in a stepped configuration, where the water is purified and elevated from the lower water purification device to the upper water purification device. The modular water purification system may purify the water. The water purification process may be repeated by each of the water purification devices to increase the purification efficiency. The stacked water purification system may allow elevating water from the bottom of the system to the top of the system similarly to a pump system. The stackable water purification system may purify and pump water.

The purification system may be stacked to the desired height. The water may travel upward continuously until it is condensed into water and purified. It also may be suitable to continuously stack multiple evaporation assemblies with a condensation assembly condensing water only on the top of the configuration allowing the water vapor to travel upwardly to condensate on the top condensation assembly defining a solar powered water pump with zero moving parts. It should be understood that the evaporation assembly 20 and the condensation assembly 40 may be modular in number or orientation, as well as shape.

The present invention may include the evaporation assembly 20 and the enclosure 60 defining an oven configuration where the evaporation assembly 20 and the enclosure 60 may be opaque or transparent. The evaporation assembly 20 may have multiple heating elements 27. The oven configuration may rely on heating the entire enclosure 60 and evaporation assembly 20 creating an oven like environment. Multiple evaporation assembly 20 may be stacked defining a stepped oven configuration. A top of the steps of the stepped oven configuration may be the only step that includes the condenser to cool the water vapor only in the upper step. The stepped oven configuration may have multiple of the evaporation assembly 20 stacked continuously with the condensation assembly 40 only at the uppermost step of the configuration to allow a continuous evaporation of water for condensation of the vapor only at the uppermost step of the configuration. It should be understood, that the present invention is modular, thereby the evaporation assembly 20 and the condensation assembly 40 may be stacked in different ways and configurations.

In different embodiments the modular water purification system may include the enclosure 60 made of opaque or transparent materials. It also may be suitable to include a magnifying glass to the enclosure 60 to magnify the sunlight and thereby focus the solar energy to the platform 22 of the evaporation assembly 20 to increase solar intensity on the platform 22. It also may be suitable to provide mirrors to the enclosure 60 to make the interior of the evaporation assembly 20 similar to an oven chamber.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A modular water purification system, comprising:
   an evaporation assembly including an evaporation platform configured to heat water and produce water vapor, wherein the evaporation platform is configured to be primarily heated by sun heat, wherein the evaporation platform is assisted by supplementary heating sources, wherein the evaporation assembly includes an inlet to connect a water source there through, wherein the evaporation platform has a substantially rectangular shape with four walls perpendicularly attached to each edge, defining an evaporation container with a substantially cuboid shape to allow heating of water;
   a condensation assembly including a condensation reservoir and at least one condenser configured to convert the water vapor into liquid water, wherein the condenser is assisted by an external power source, wherein the condenser reservoir contains the liquid water, said condenser reservoir has an outlet to empty the reservoir, wherein the condensation reservoir has a substantially cuboid shape with a rectangular base and is located adjacent to a rear elevated portion of the evaporation assembly; and
   a waterproof enclosure surrounding and covering the evaporation assembly and the condensation assembly, said waterproof enclosure is configured to contain the water vapor and prevent external air contamination, wherein said evaporation assembly, said condensation assembly and said waterproof enclosure define a water purification device, said water purification device is stackable and modular, wherein the water purification device is configured to purify and elevate water through a solar-powered evaporation-condensation cycle without moving parts, wherein the waterproof enclosure has a bell-shaped profile with a curved upper surface extending from a lower perimeter that encompasses and seals over the upper edges of both the condensation reservoir and the evaporation platform, said bell-shaped profile being defined by a smooth, upwardly convex curvature that directs water vapor toward the condenser.

2. The modular water purification system set forth in claim 1, wherein the supplementary heating sources comprise heating elements located in the evaporation platform, wherein the heating elements are powered by power source.

3. The modular water purification system set forth in claim 1, wherein the at least one condenser is integrated into walls of the condensation reservoir.

4. The modular water purification system set forth in claim 1, wherein the outlet of the condensation reservoir is configured to cooperate with an inlet of a second modular water purification device.

5. The modular water purification system set forth in claim 4, wherein multiple water purification devices are modularly connected in a stackable way, defining a modular water purification system in a stepped configuration.

6. The modular water purification system set forth in claim 5, wherein the stepped configuration is configured to allow elevating water from a lower water purification device to an upper water purification device.

7. The modular water purification system set forth in claim 1, wherein the outlet has a filter configured to filter debris.

8. The modular water purification system set forth in claim 1, wherein multiple evaporation assemblies are stacked continuously, defining a stepped configuration with an uppermost step having a condenser assembly to cool the water vapor produced by the multiple evaporation assemblies.

9. The modular water purification system set forth in claim 1, wherein the enclosure is transparent.

10. The modular water purification system set forth in claim 1, wherein the enclosure is opaque.

11. The modular water purification system set forth in claim 1, wherein the enclosure has a plurality of mirrors.

12. The modular water purification system set forth in claim 1, wherein the enclosure has a magnifying glass to increase solar intensity in the evaporation platform.

13. A modular water purification system, comprising:
    an evaporation assembly including an evaporation platform configured to heat water and produce water vapor, wherein the evaporation platform is configured to be primarily heated by sun heat, wherein the evaporation platform is assisted by supplementary heating sources, wherein the evaporation assembly includes an inlet to connect a water source there through, wherein the supplementary heating sources comprise heating elements located in the evaporation platform, wherein the heating elements are powered by power source, wherein the evaporation platform has a substantially rectangular shape with four walls perpendicularly attached to each edge, defining a thin evaporation container with a substantially cuboid shape to allow efficient heating of water;
    a condensation assembly including a condensation reservoir and at least one condenser configured to convert the water vapor into liquid water, wherein the condenser is assisted by an external power source, wherein the condenser reservoir contains the liquid water, said condenser reservoir has an outlet to empty the reservoir, wherein the at least one condenser is integrated into walls of the condensation reservoir, wherein the condensation reservoir has a substantially cuboid shape with a rectangular base and is located adjacent to a rear elevated portion of the evaporation assembly; and
    a waterproof enclosure surrounding the evaporation assembly and the condensation assembly, said waterproof enclosure is configured to contain the water vapor and prevent external air contamination, wherein said evaporation assembly, said condensation assembly and said waterproof enclosure define a water purification device, said water purification device is stackable and modular, wherein the waterproof enclosure has a bell-shaped profile with a curved upper surface extending from a lower perimeter that encompasses and seals over the upper edges of both the condensation reservoir and the evaporation platform, said bell-shaped profile being defined by a smooth, upwardly convex curvature that directs water vapor toward the condenser; and wherein multiple water purification devices are modularly connected in a stackable way, defining a modular water purification system in a stepped configuration, wherein the stepped configuration is configured to allow elevating water from a lower water purification device to an upper water purification device, wherein the outlet has a filter configured to filter debris, wherein the water purification system is configured to purify and elevate water through a solar-powered evaporation-condensation cycle without moving parts.

14. A modular water purification system, consisting of:

an evaporation assembly including an evaporation platform configured to heat water and produce water vapor, wherein the evaporation platform is configured to be primarily heated by sun heat, wherein the evaporation platform is assisted by supplementary heating sources, wherein the evaporation assembly includes an inlet to connect a water source there through, wherein the supplementary heating sources comprise heating elements located in the evaporation platform, wherein the heating elements are powered by power source, wherein the evaporation platform has a substantially rectangular shape with four walls perpendicularly attached to each edge, defining a thin evaporation container with a substantially cuboid shape to allow efficient heating of water;

a condensation assembly including a condensation reservoir and at least one condenser configured to convert the water vapor into liquid water, wherein the condenser is assisted by an external power source, wherein the condenser reservoir contains the liquid water, said condenser reservoir has an outlet to empty the reservoir, wherein the at least one condenser is integrated into walls of the condensation reservoir, wherein the condensation reservoir has a substantially cuboid shape with a rectangular base and is located adjacent to a rear elevated portion of the evaporation assembly; and a waterproof enclosure surrounding the evaporation assembly and the condensation assembly, said waterproof enclosure is configured to contain the water vapor and prevent external air contamination, wherein said evaporation assembly, said condensation assembly and said waterproof enclosure define a water purification device, said water purification device is stackable and modular, wherein the waterproof enclosure has a bell-shaped profile with a curved upper surface extending from a lower perimeter that encompasses and seals over the upper edges of both the condensation reservoir and the evaporation platform, said bell-shaped profile being defined by a smooth, upwardly convex curvature that directs water vapor toward the condenser; and wherein multiple water purification devices are modularly connected in a stackable way, defining a modular water purification system in a stepped configuration, wherein the stepped configuration is configured to allow elevating water from a lower water purification device to an upper water purification device, wherein the outlet has a filter configured to filter debris, wherein the water purification system is configured to purify and elevate water through a solar-powered evaporation-condensation cycle without moving parts.

* * * * *